United States Patent [19]
Coult et al.

[11] Patent Number: 5,625,490
[45] Date of Patent: Apr. 29, 1997

[54] OPTICAL COUPLER

[75] Inventors: David G. Coult, Bechtelsville; William L. Emkey, Bethlehem; Curtis A. Jack, Rockland Township, Berks County; Michele A. Milbrodt, Macungie, all of Pa.

[73] Assignee: Lucent Technologies Inc., Murray Hill, N.J.

[21] Appl. No.: 493,596

[22] Filed: Jun. 22, 1995

Related U.S. Application Data

[63] Continuation of Ser. No. 282,764, Jul. 29, 1994, abandoned, which is a continuation of Ser. No. 962,363, Oct. 16, 1992, abandoned.

[51] Int. Cl.$^6$ .................................................. G02B 5/30
[52] U.S. Cl. .................. 359/484; 359/487; 359/495; 359/497; 359/122
[58] Field of Search .................. 359/485, 487, 359/484, 495, 496, 497, 634, 122; 385/11

[56] References Cited

U.S. PATENT DOCUMENTS

| | | | |
|---|---|---|---|
| 4,566,761 | 1/1986 | Carlsen et al. | 350/401 |
| 4,588,262 | 5/1986 | Nelson | 359/495 |
| 4,720,162 | 1/1988 | Mochizuki et al. | 385/11 |
| 4,744,075 | 5/1988 | Buhrer | 370/3 |
| 4,745,591 | 5/1988 | Foley | 370/3 |
| 4,761,050 | 8/1988 | Byron | 385/11 |
| 4,805,977 | 2/1989 | Tamura et al. | 385/11 |
| 5,056,887 | 10/1991 | Ohshima | 359/487 |
| 5,111,326 | 5/1992 | Ball | 385/11 |
| 5,179,462 | 1/1993 | Kageyama et al. | 359/490 |
| 5,210,643 | 5/1993 | Fugii et al. | 359/634 |
| 5,212,594 | 5/1993 | Joynes | 359/497 |
| 5,223,975 | 6/1993 | Naganuma et al. | 359/495 |

OTHER PUBLICATIONS

"Polarization and Wavelength Multiplexed . . . ", H. Heidrich et al., *Journal of Opt. Comm.*, vol. 7, No. 4, 1986, pp. 136–138.
"Wavelength–Polarization double multiplexed . . . ", S. Thaniyavarn et al., *SPIE*, vol. 995, 1988, pp. 165–168.
"Four–channel wavelength multiplexing . . . ", Y. Fujii et al., *App. Optics*, vol. 28, No. 7, Apr. 1989, pp. 1305–1308.
"1×2 wavelength–selective switch . . . ", Y. Fujii, *Optics Lett.*, vol. 14, No. 18, Sep. 1989, pp. 1032–1034.

*Primary Examiner*—Ricky D. Shafer

[57] ABSTRACT

An optical coupler is disclosed which utilizes a pair of polarization selective filters to multiplex a message signal (of perhaps random polarization) with a pair of polarized pump signals onto a common signal path. The filters may be disposed within optical elements (e.g., cubes) which may be physically joined together to form a bulk optic device. An optical isolator may then be directly attached to the output of the bulk polarization independent optical coupler. The positioning of the pump signal inputs with respect to the filters provides either a co-propagating scheme or counter-propagating scheme.

13 Claims, 3 Drawing Sheets

OPTICAL COUPLER

This application is a continuation of application Ser. No. 08/282,764, filed on Jul. 29, 1994, now abandoned, which is a continuation of Ser. No. 07/962,363, filed on Oct. 16, 1992 (now abandoned).

BACKGROUND OF THE INVENTION

1. Technical Field

The present invention relates to an optical coupler and, more particularly, to an optical coupler which is insensitive to the polarization state of a message signal passing therethrough.

2. Description of the Prior Art

There exist many applications where it is desirous to multiplex optical signals at different wavelengths onto the same optical signal path. One application of current interest is in fiber-based optical amplification, where it is required to multiplex an optical message signal at a first wavelength $\lambda_S$ with a "pump" signal at a different wavelength $\lambda_P$ within an optical gain medium (such as an erbium-doped optical fiber) to provide amplification of the message signal. For the erbium-based arrangement, which appears to be the most commercially viable at this point in time, the pump source must operate at about 0.98 µm or 1.48 µm to provide amplification. Laser sources available for emitting radiation at either of these wavelengths are known to be relatively low in power, thus limiting the amount of amplification which can be obtained from a single pump source. A solution to this problem is to use multiple pumps, which necessarily increases the size of the resultant amplifier. Further, each pump laser often requires its own isolator, coupler, etc., which may introduce intolerable losses into the system.

Another application of multiple pump sources is the resultant increase in reliability of the amplifier. That is, for systems using only a single pump laser, failure of the pump results in complete loss of amplification. Therefore, most applications recommend the use of (or availability of, at least) additional pump sources.

There exists in the prior art an optical coupling arrangement for providing a plurality of pump sources with a message signal to increase the reliability of an associated optical coupler. U.S. Pat. No. 4,805,977, issued to Y. Tamura et al. on Feb. 21, 1989 discloses an optical coupler comprising a polarization beam combiner (i.e., polarization multiplexer) responsive to a pair of orthogonal (in polarization state) pump signals. The output from the polarization multiplexer provides a pump signal of increased power (with respect to that associated with a single pump) which is subsequently applied as an input to a wavelength division multiplexer for combining with an applied message signal. Although the Tamura et al. arrangement does provide increased pump power, the system remains sensitive to the polarization state of the received message signal. In most applications, the polarization state of the message signal is not known and may even vary as a function of time.

Therefore, a need remains in the prior art to provide a multiplexer, suitable for fiber amplifier applications, which is insensitive to the polarization state of the message signal and compatible for integration with an optical isolator.

SUMMARY OF THE INVENTION

The need remaining in the prior art is addressed by the present invention which relates to an optical coupler and, more particularly, to a polarization independent optical coupler.

In accordance with an exemplary embodiment of the present invention, a message signal (which may be of random polarization) and a first polarized pump signal are applied as separate inputs to a first filtering means. The first filtering means also functions as a polarization selective device which is disposed such that the first pump signal and message signal are multiplexer onto the same signal path. Simultaneously, a second polarized pump signal is applied as an input to the second filtering means. The second filtering means is oriented with respect to the first filtering means such that the second polarized pump signal is coupled into the same optical signal path with the first polarized pump signal and message signal. Depending upon the orientation of the pump signal paths with respect to the first and second filtering means, either a co-propagating or counter-propagating scheme may be formed.

The combination of signals may subsequently be applied as an input to an optical fiber amplifier to provide a pair of pump signals for amplifying the message signal.

In one exemplary arrangement, an optical isolator may be coupled to the output of the second filtering means to prevent reflections associated with any upstream optical components (e.g., fiber amplifier) from propagating back into the coupler.

For one embodiment of the present invention, the first filtering means may be disposed within a first optically transparent element and the second filtering means disposed within a second optically transparent element.

In an alternative embodiment, the first and second filtering means may be disposed within first and second optically transparent elements (e.g., cubic elements), with a half-wave plate disposed therebetween. The half-wave plate functions to rotate the polarization state of the first polarized signal so as to provide the necessary alignment of this signal with the second filtering means. The various elements in either embodiment may be joined together to form a single bulk optic device capable of providing the desired multiplexing.

Various other embodiments of the present invention, as well as advantages, will become apparent during the course of the following discussion and by reference to the following drawings.

BRIEF DESCRIPTION OF THE DRAWING

Referring now to the drawings, where like numerals represent like parts in several views.

DETAILED DESCRIPTION

Figure 1:
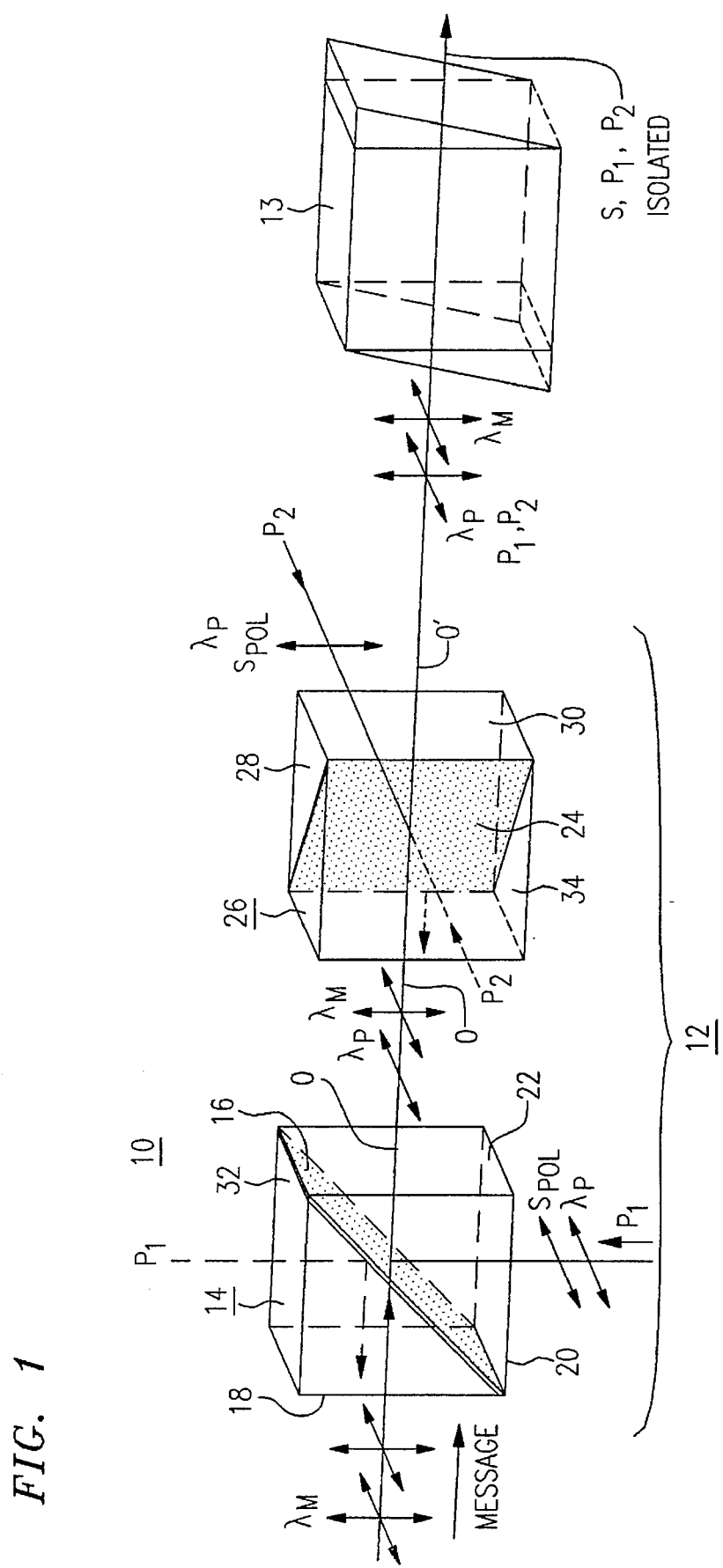
FIG. 1 illustrates an exemplary multiplexer-isolator formed in accordance with the present invention.

FIG. 1 illustrates an exemplary optical coupler-isolator 10 formed in accordance with the present invention. As shown, coupler-isolator 10 includes a coupling component 12 and an isolator component 13. In particular, coupling component 12 comprises a first optically transparent element 14, including a polarization selective filter 16, disposed as shown in FIG. 1. Filter 16, as well as other filter elements described below, may comprise discrete elements or, preferably, coatings or films disposed between and attached to optically transparent elements. In the illustrated embodiment, first element 14 comprises a cubic element (although any suitable shape may be used). An input message signal M (at a wavelength $\lambda_M$ and perhaps randomly polarized) is coupled to a first face 18 of first element 14. A lens (not shown) may be used to provide the coupling. A first pump signal $P_1$ (at a wavelength $\lambda_P$ different from $\lambda_M$ and having a known polarization $S_{POL}$, as indicated) is coupled to a second face 20 of element 14. Filter 16 is chosen so as to transmit the wavelength $\lambda_M$ of message signal M through first element 14 relatively unimpeded, yet block (i.e., reflect) the selected polarization of first pump $P_1$ at wavelength $\lambda_P$. Thus, polarized pump signal $P_1$ and message signal M will be multiplexed onto a common output signal path O and exit along face 22 of first element 14. Multiplexed signals $P_1$ and M next encounter a second filter 24, which is designed (like first filter 16) as a polarization selective device. As shown in FIG. 1, second filter 24 is disposed so as to transmit both signals $P_1$ and M. For the particular embodiment of FIG. 1, second filter 24 is positioned within a second optically transparent second element 26.

As mentioned above, the usefulness of fiber-based optical amplifiers is increased when the power of the pump signal is increased. Such an increase is possible with coupler-isolator 10 of the present invention by applying a second pump signal $P_2$ as an additional input to coupling component 12. In the example of FIG. 1, second pump $P_2$ is coupled to second optically transparent element 26 at face 28. The polarization orientation of second pump signal $P_2$ with respect to second filter 24 will allow this signal to be reflected at second filter 24 essentially unimpeded and be directed through endface 30 of second element 26 and onto output signal path O' with multiplexer signals $P_1$ and M. Therefore, the output from component 12 comprises a randomly polarized message signal and a pair of pump signals, $P_1$ and $P_2$, which then may be applied as an input to a fiber amplifier (not shown).

The arrangement as described above may be referred to as a "co-propagating" scheme, where the pump signals are coupled into component 12 in a manner such that they propagate in the same direction as message signal M. As is well-known in fiber amplifier technology, "counter-propagating" arrangements may also be used. In a counter-propagating scheme, the pump signals propagating in the opposite direction of the message signal. Amplification will occur in a doped fiber section as long as both the message and pump signals are present at the same time; the propagation direction of the pump signal is irrelevant. FIG. 1 may be simply modified to provide a counter-propagating arrangement by re-locating the input ports for the pump signals. Referring to FIG. 1, the application of pump signal $P_1$ to face 32 of first element 14 will provide a counter-propagating first pump signal, as indicated by the dotted lines. Similarly, the application of pump signal $P_2$ to face 34 of second element 26 will provide second pump signal $P_2$ in the direction as indicated by the dotted line. For the counter-propagating embodiment, second pump signal $P_2$ subsequently travels through first element 14 unimpeded and is coupled onto the same signal path with message signal M and first pump signal $P_1$. Therefore, by locating a doped fiber section before the input of element 14 (not shown), amplification may be achieved. The amplified message signal would then pass through both elements 14 and 26.

For fiber amplifier applications, as discussed above, the need may arise to prevent reflected signals from re-entering the coupler. In particular, most fiber amplifier configurations require the positioning of an optical isolator between the coupler and the fiber amplifier itself. The arrangement of the present invention as illustrated in FIG. 1 addresses this problem by incorporating an optical isolator in the coupler arrangement. As shown, optical isolator 13 is coupled to output endface 30 of component 12. Therefore, output from isolator 13 may then be directly coupled to the input of a fiber amplifier. Isolator 13 may be of any well-known polarization independent structure. Since both coupling component 12 and isolator 13 utilize passive optics, the various elements (i.e., first optically transparent cube 14, second optically transparent cube 26 and isolator 13) may be directly attached (utilizing an index-matching adhesive, for example) to form a bulk optic device.

Figure 2:
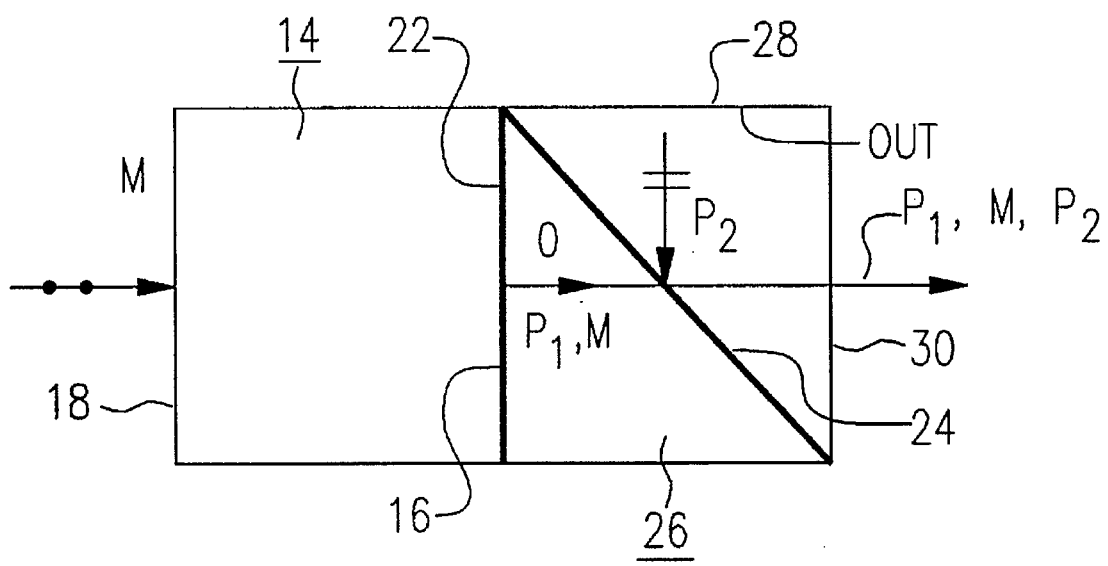
FIG. 2 illustrates a top view of the multiplexer portion of FIG. 1, showing in particular the optical signal path through the coupling component.

A simplified top view of coupling component 12 is shown in FIG. 2, illustrating in particular the signal path through both first element 14 and second element 26. Hidden in the top view is the application of first pump signal $P_1$ to face 20 of element 14 (see FIG. 1). Message signal M is applied to face 18 of first element 14. Filter 16, as illustrated in FIG. 1, is also relatively hidden in this view, being illustrated as having an end as indicated by the darkened line 16 in FIG. 2. As discussed above, message signal M and first pump signal $P_1$ are multiplexed by first filter 16 onto output signal path O and subsequently applied as an input to second element 26, where second filter 24 is disposed within element 26 at the location illustrated in FIG. 2. Second filter 24, as described above, is essentially identical to first filter 16 and is utilized to transmit first pump signal $P_1$ and message signal M. The orientation of second filter 24 is such that the transmitted signals will exit second element 26 along face 30. Second pump signal $P_2$, applied to face 28 of second element 26, is reflected by second filter 24 so as to be multiplexed with message signal M and first pump $P_1$.

Figure 3:
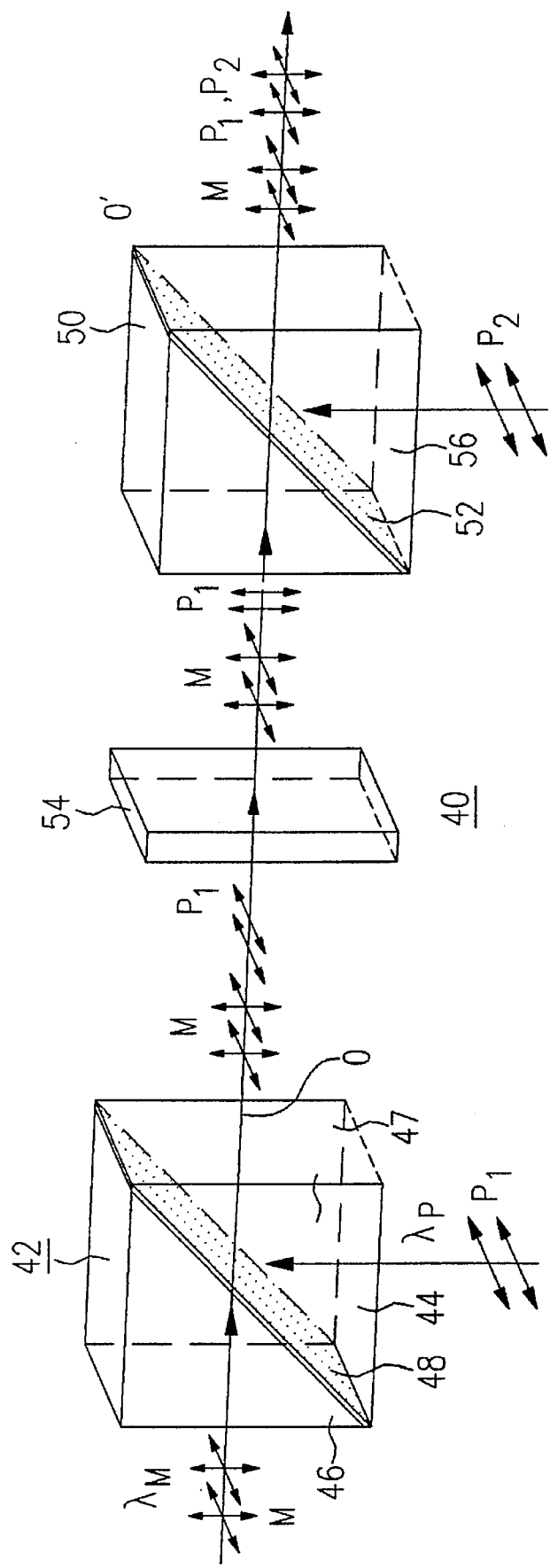
FIG. 3 illustrates an alternative multiplexer arrangement of the present invention.

FIG. 3 illustrates an alternative optical coupler 40 formed in accordance with the teachings of the present invention. As shown, coupler 40 comprises a first optically transparent element 42 (e.g., cubic element) coupled at a first face 46 to an input message signal M (at a wavelength $\lambda_M$ and randomly polarized). A first pump signal $P_1$ (of known polarization and wavelength $\lambda_P$ different from $\lambda_M$) is applied to a second face 44 of cubic element 42. A first polarization selective filter 48 is disposed within cubic element 42 such that message signal M passes through filter 48 essentially unimpeded and first pump signal $P_1$ is reflected. Therefore, first filter 48 functions to multiplex signals M and $P_1$ onto a common output signal path O exiting along face 47 of first element 42. Coupler 40 further comprises a second optically transparent cubic element 50 including a second polarization selective filter 52 oriented in a similar fashion as first filter 48. A polarization rotator (for example, a half-wave plate) 54 is illustrated in FIG. 3 as being disposed between first cubic element 42 and second cubic element 50. Polarization rotator 54 functions to rotate the polarization state of first pump signal $P_1$ such that signal $P_1$ will subsequently be transmitted through second filter 52 relatively unimpeded.

A second pump signal $P_2$ (at wavelength $\lambda_P$ and of a known polarization) is applied as an input to a first face 56 of second cubic element 50 such that signal $P_2$ is blocked (reflected) by second filter 52. Therefore, second pump signal $P_2$ will be multiplexed onto a common output signal path O' with message signal M and first pump signal $P_1$. The multiplexed output from second cubic element 50 may then be applied as an input to an optical isolator (not shown) directly attached to the output of second cubic element 50.

We claim:

1. An optical coupler comprising:
   a first polarization selective filtering member comprising first and second input ports, said first input port receiving a message signal (M) at a predetermined wavelength $\lambda_M$ and comprising an unknown polarization state, wherein said unknown polarization state can be random as a function of time, and said second input port receiving a first polarized signal ($P_1$) at a predetermined wavelength $\lambda_P$ different from $\lambda_M$, said first polarization selective filtering member transmitting said message signal essentially unimpeded and reflecting said first polarized signal such that said message signal and said first polarized signal are provided on a common signal path; and a second polarization selective filtering member for receiving the combined message signal and the first polarized signal such that the combined message signal and the first polarized signal are transmitted through the second polarization selective filtering member essentially unimpeded, the second polarization selective filtering member being responsive to a second polarized signal ($P_2$), said second polarization selective filtering member oriented with respect to said first polarization selective filtering member such that said second polarized signal is coupled onto said common signal path with said message signal and said first polarized signal.

2. An optical coupler as defined in claim 1 wherein the first polarization selective filtering member is oriented such that the message signal and the first polarized signal are coupled onto a common output signal path and propagate in the same direction; and the second polarization selective filtering member is oriented with respect to the first polarization selective filtering member such that the second polarized signal is coupled onto said common output signal path with the message signal and first polarized signal.

3. An optical coupler as defined in claim 1 wherein the first polarization selective filtering member is oriented such that the message signal and the first polarized signal are coupled onto a common input signal path and propagate in opposite directions; and the second polarization selective filtering member is oriented with respect to the first polarization selective filtering member such that the second polarized signal subsequently passes through said first polarization selective filtering member and is coupled onto the common input signal path and propagates in the same direction as the first polarized signal.

4. An optical coupler as defined in claim 1 wherein said message signal (M) is randomly polarized.

5. An optical coupler as defined in claim 1 suitable for use with a fiber-based optical amplifier, wherein the first and second polarized signals comprise pump signals at a wavelength ($\lambda_P$) different from the wavelength ($\lambda_M$) of the message signal.

6. An optical coupler as defined in claim 5 wherein an optical isolator is coupled to the output of the coupler so as to be responsive to the output signal from said optical coupler.

7. An optical coupler as defined in claim 1 wherein the first polarization selective filtering member is disposed within a first optically transparent element, the message signal and the first polarized signal capable of being applied as inputs to orthogonal faces of said optically transparent element, the signals being combined therein to form a first multiplexed signal.

8. An optical coupler as defined in claim 7 wherein the first optically transparent element comprises a cubic element.

9. An optical coupler as defined in claim 7 wherein the second polarization selective filtering member is disposed within a second optically transparent element, the first multiplexed signal and the second polarized signal capable of being applied as separate inputs thereto, the signals being combined therein to form a second multiplexed signal as the output of said optical coupler.

10. An optical coupler as defined in claim 9 wherein the second optically transparent element comprises a cubic element.

11. An optical coupler as defined in claim 9 wherein the second polarization selective filtering member is disposed such that the second polarized signal will be essentially reflected and the first multiplexed signal will be transmitted essentially unimpeded and the combination of the first multiplexed signal and the second polarized signal will form the second multiplexed signal output of said optical coupler.

12. An optical coupler as defined in claim 1 wherein the coupler comprises a first cubic element formed to include the first polarization selective filtering member, the message signal and the first polarized signal capable of being applied as separate inputs to orthogonal faces of said first cubic element and being combined therein to form a first multiplexed signal exiting along an output face thereof;

a second cubic element formed to include the second polarization selective filtering member, the second polarized signal capable of being applied as an input thereto; and polarization rotating means disposed between the first cubic element and the second cubic element for rotating the polarization state of the first polarized signal such that said first polarized signal will be essentially unimpeded by the second filtering member.

13. An optical coupler as defined in claim 12 wherein an optical isolator as coupled to the output of the second cubic element.

* * * * *